(12) United States Patent
Ahlgren et al.

(10) Patent No.: US 8,025,434 B2
(45) Date of Patent: Sep. 27, 2011

(54) TWO-SIDED ILLUMINATION DEVICE

(75) Inventors: Pentti Olavi Ahlgren, Helsinki (FI); Ilkka Tapani Heikkilä, Halikko as (FI)

(73) Assignee: Nokia Corporation, Espoo (FI)

( * ) Notice: Subject to any disclaimer, the term of this patent is extended or adjusted under 35 U.S.C. 154(b) by 332 days.

(21) Appl. No.: 12/156,637

(22) Filed: Jun. 3, 2008

(65) Prior Publication Data
US 2009/0294266 A1 Dec. 3, 2009

(51) Int. Cl.
*F21V 7/10* (2006.01)
*G02F 1/13357* (2006.01)

(52) U.S. Cl. ........... 362/613; 362/616; 362/631; 349/68

(58) Field of Classification Search ........... 362/612, 362/613, 616, 631, 632–634, 555; 349/68
See application file for complete search history.

(56) References Cited

U.S. PATENT DOCUMENTS

| | | | | |
|---|---|---|---|---|
| 5,202,950 A * | 4/1993 | Arego et al. | | 385/146 |
| 5,963,280 A * | 10/1999 | Okuda et al. | | 349/65 |
| 6,814,475 B2 * | 11/2004 | Amano | | 362/487 |
| 6,871,975 B2 * | 3/2005 | Chuang | | 362/27 |
| 7,200,288 B2 * | 4/2007 | Ogura | | 382/321 |
| 7,306,355 B2 * | 12/2007 | Walser et al. | | 362/494 |
| 7,534,026 B2 * | 5/2009 | Uehara et al. | | 362/613 |
| 2003/0063456 A1 * | 4/2003 | Katahira | | 362/27 |
| 2004/0095740 A1 * | 5/2004 | Mai et al. | | 362/27 |
| 2004/0223343 A1 * | 11/2004 | Chu et al. | | 362/561 |
| 2005/0247944 A1 | 11/2005 | Haque et al. | | 257/79 |
| 2006/0243893 A1 * | 11/2006 | Ng et al. | | 250/227.11 |
| 2006/0256579 A1 * | 11/2006 | Yang et al. | | 362/613 |

* cited by examiner

*Primary Examiner* — Ismael Negron
(74) *Attorney, Agent, or Firm* — Harrington & Smith (57) ABSTRACT

A two-sided illumination device including a printed wiring board, a first light source and first translucent member connected to a first side of the wiring board, and a second light source and second translucent member connected to a second side of the wiring board. The first translucent member is configured to transfer light from the first light source to a surface of the first translucent member, while the second translucent member is configured to transfer light from the second light source to a surface of the second translucent member. The illumination device is used for illuminating a user input region of an apparatus.

30 Claims, 11 Drawing Sheets

TWO-SIDED ILLUMINATION DEVICE

BACKGROUND OF THE INVENTION

1. Field of the Invention

The invention relates to an electronic device and, more particularly, to illumination for an electronic device.

2. Brief Description of Prior Developments

As the features in mobile devices become more sophisticated, there is also need for user interfaces that can handle the increasing amounts of information that is needed with different applications. With traditional mechanical keypads/boards, one way to achieve this is to have different markings on the keys for different applications. This can be achieved by having different illuminations which reveal different keys.

U.S. Patent Application Publication No. 2005/0247944 ("Semiconductor Light Emitting Device with Flexible Substrate") describes attachment of multiple light emitting diodes (LEDs) to opposite sides of a flexible substrate (such as a flex printed wiring board (PWB), for example). However, as consumers demand increased functionality from electronic devices, there is a continuing need to provide improved devices having increased user input capabilities while maintaining robust and reliable product configurations.

Accordingly, there is a desire to provide an improved illumination configuration for an electronic device.

SUMMARY OF THE INVENTION

In accordance with one aspect of the exemplary embodiment of the invention, an apparatus is disclosed. The apparatus includes a printed wiring board, a first light source, a first translucent member, a second light source, and a second translucent member. The printed wiring board includes a first side and a second side. The first light source is connected to the first side of the printed wiring board. The first translucent member is connected to the printed wiring board. The first translucent member is configured to transfer light from the first light source to a surface of the first translucent member. The second light source is connected to the second side of the printed wiring board. The second translucent member is connected to the printed wiring board. The second translucent member is configured to transfer light from the second light source to a surface of the second translucent member.

In accordance with another aspect of the exemplary embodiment of the invention, an apparatus is disclosed. The apparatus includes a housing section, electronic circuitry, a user input region, a first light source, a first lightguide, a second light source, a second lightguide, and a printed wiring board. The electronic circuitry is mounted in the housing section. The user input region is connected to the housing section. The first light source is connected to the first lightguide. The first lightguide is configured to deliver light from the first light source to the user input region. The second light source is connected to the second lightguide. The second lightguide is configured to deliver light from the second light source to the user input region. The printed wiring board is between the first lightguide and the second lightguide. The printed wiring board is configured to separate light emitting from the first light source and the second light source.

In accordance with another aspect of the exemplary embodiment of the invention, a method is disclosed. A printed wiring board is provided. The printed wiring board includes a first side and a second side. A first light source is connected to the first side of the printed wiring board. A first translucent member is connected to the printed wiring board. The first translucent member is configured to transfer light from the first light source to a surface of the first translucent member. A second light source is connected to the second side of the printed wiring board. A second translucent member is connected to the printed wiring board. The second translucent member is configured to transfer light from the second light source to a surface of the second translucent member.

In accordance with another aspect of the exemplary embodiment of the invention, a method is disclosed. A housing section is provided. Electronic circuitry is installed in the housing section. A user input region is connected to the housing section. A first light source is connected to a first lightguide. The first lightguide is configured to deliver light from the first light source to the user input region. A second light source is connected to a second lightguide. The second lightguide is configured to deliver light from the second light source to the user input region. A printed wiring board is provided between the first lightguide and the second lightguide. The printed wiring board is configured to separate light emitting from the first light source and the second light source.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
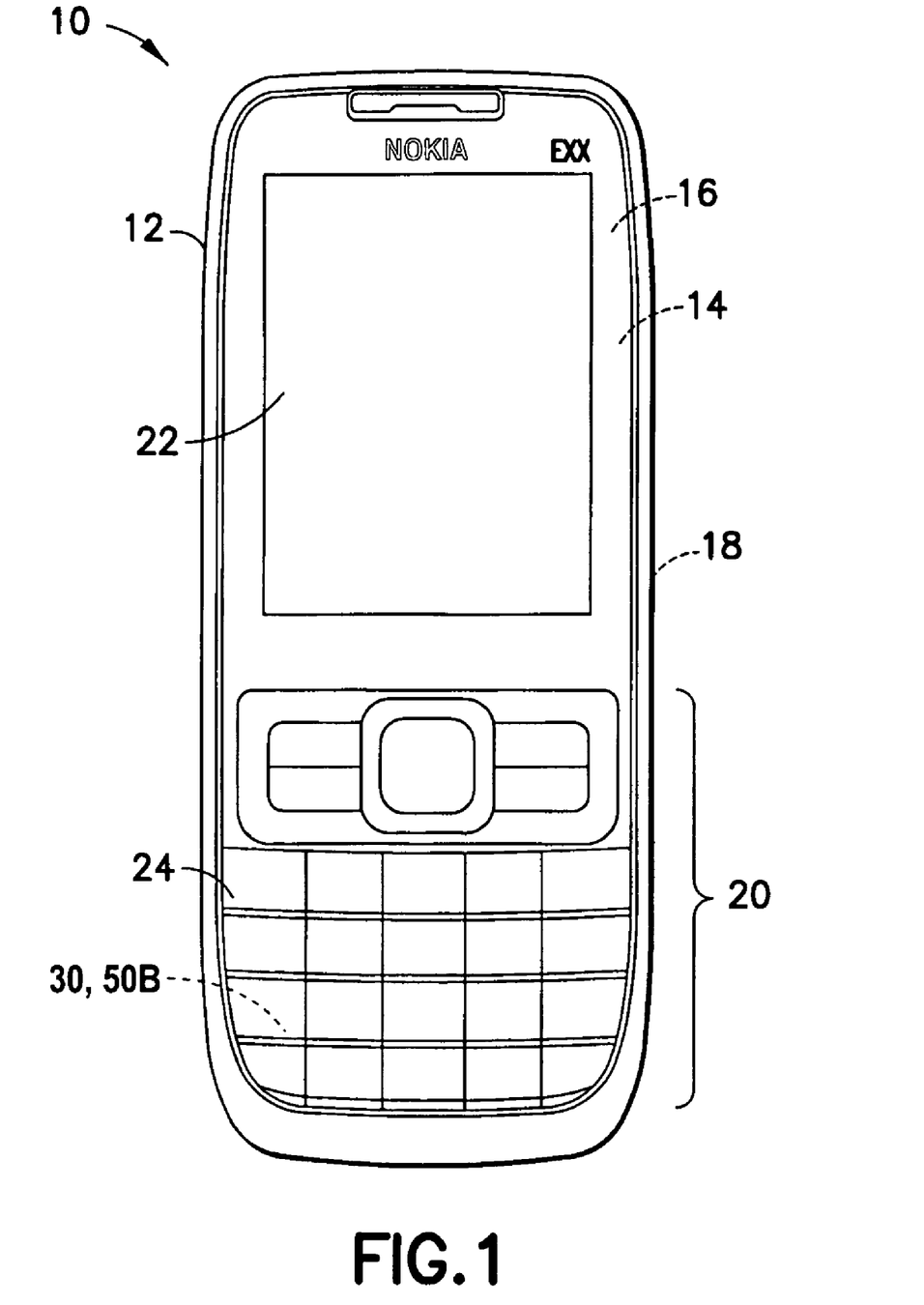
FIG. 1 is a front view of an electronic device comprising features of the invention.

Referring to FIG. 1, there is shown a front view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

In this exemplary embodiment the device 10 is a multi-function portable electronic device. However, in alternate embodiments, features of the exemplary embodiment of this invention could be used in any suitable type of hand-held portable electronic device such as a mobile phone, a gaming device, a music player, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a user input region 20 and a display 22. The display 22 could also form a user input section, such as a touch screen. It should be noted that in alternate embodiments, the device 10 can have any suitable type of features as known in the art.

Figure 2:
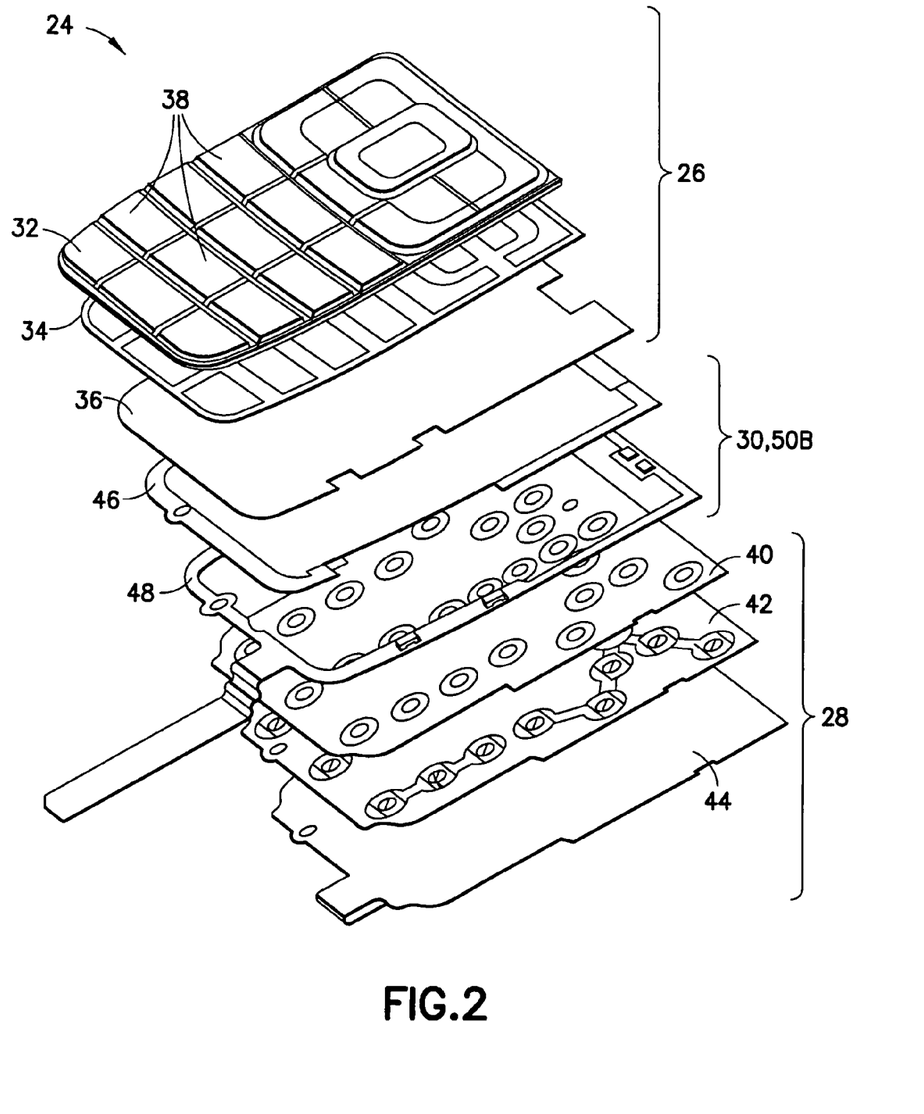
FIG. 2 is an exploded perspective view of a keypad assembly used in the electronic device shown in FIG. 1.

Referring now also to FIG. 2, an exploded perspective view of a keypad assembly 24 is shown. The keypad assembly 24 is mounted in the housing 12. The keypad assembly 24 comprises a keypad module 26, a dome-switches module 28, and a lightguide module 30 between the keypad module 26 and the dome-switches module 28. However, alternate embodiments may provide any suitable orientation for the keypad module 26, the dome-switches module 28, and the lightguide module 30. The keypad assembly 24 may provide for an overlayed changeable graphics configuration, or a graphics changing keypad, having a hidden mode, a number mode, and an alphabet mode, for example.

The keypad module 26 may comprise a first keypad layer 32, a second keypad layer 34, and a third keypad layer 36. As is known in the art, the keypad module 26 forms at least a portion of the user input region 20 and may comprise several planar layers. The first keypad layer 32 comprises keys 38 actuable by a user of the device 10 for inputting information, such as when entering telephone numbers, writing text messages, writing emails, for example. It should be noted that although three keypad layers are illustrated, any suitable number of layers may be provided.

The dome-switches module 28 may comprise a first dome-switches layer 40, a second dome-switches layer 42, and a third dome-switches layer 44. As is known in the art, the dome-switches module 28 may comprise several planar layers having key switches and dome regions. The dome-switches module 28 may also include a main printed wiring board (PWB). The key switches may be configured for sensing pressure from a user. When the device is assembled, the dome regions fall below one of the keys 38 of the keypad 20 or keymat so that a user can actuate the key switches. It should be noted that although three dome-switches layers are illustrated, any suitable number of layers may be provided.

The lightguide module 30 may comprise a first lightguide layer 46 and a second lightguide layer 48. The first lightguide layer 46 may comprise two lightguides. The second lightguide layer 48 may have attached LEDs configured to be aligned with the lightguides of the first lightguide layer 46. However, any suitable configuration may be provided.

Figure 3:
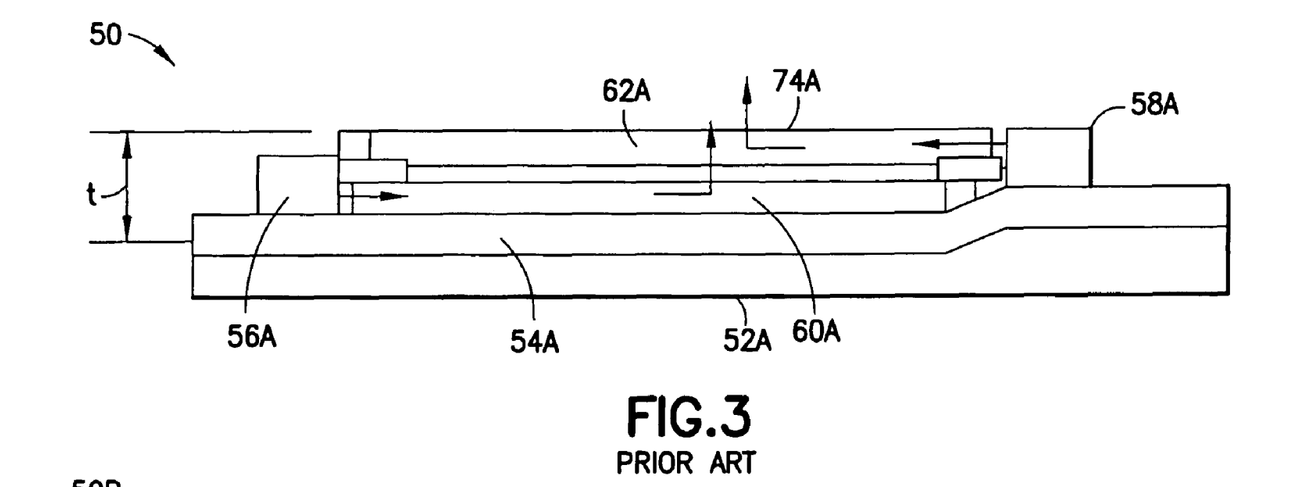
FIG. 3 is a side view of a prior art lightguide module.

Referring now also to FIG. 3, a lightguide module 50A according to prior art configuration is illustrated. The lightguide module 50A comprises a base member 52A, a flexible printed circuit (FPC) (or flexible printed wiring board (PWB)) 54A, a first light emitting diode (LED) 56A, a second LED 58A, a first lightguide 60A, and a second lightguide 62A.

The base member 52A may provide a support structure for the FPC 54A. The base member 52A may also comprise another FPC or flexible printed wiring board. The FPC 54A may be connected or attached to the base member 52A in any suitable manner.

The first LED 56A is attached to the FPC 54A. The second LED 58A is attached to a raised portion of the FPC 54A. The first and second LEDs 56A, 58A may be side type LEDs for example. However, any suitable type of LEDs may be provided. Additionally, the first and the second LEDs 56A, 58A may be attached or fastened to the FPC 54A in any suitable fashion.

The first lightguide, or lower layer light guide, 60A is attached to the FPC 54A between the first LED 56A and the second LED 58A. The first lightguide 60A may be attached or fastened to the FPC 54A in any suitable fashion. The second lightguide, or upper layer light guide, 62A is stacked on top of the first lightguide 60A. The second lightguide 62A may be attached or fastened to the first lightguide 60A in any suitable fashion. The LEDs 56A, 58A may be connected to the lightguides 60A, 62A with supporting members therebetween. However, the LEDs may be directly attached or fastened to the lightguides 60A, 62A. The FPC 54A, LEDs 56A, 58A, and stacked lightguides 60A, 62A provide a compact configuration which may have a total thickness "t" under about 1.2 mm.

Each of the lightguides 60A, 62A may be a substantially transparent or translucent member having a general planar shape. As is known in the art, the lightguides 60A, 62A conduct light from a light source 56A, 58A to an area under the user input region 20 (and/or the display 22) to provide backlighting.

Light is emitted from the side LEDs 56A, 58A and incoupled into the lightguides 60A, 62A. Each of the lightguides 60A, 62A comprises a surface 72A, 74A having, on certain areas of the lightguide surfaces 72A, 74A, prismatic shapes, which turn the light out perpendicularly from the lightguide 60A, 62A. This light from the surfaces 72A, 74A of the lightguides 60A, 62A provides light to the user input region 20.

Tapes, or other sealing type members may be provided for directing (or separating) the light emitting from the LEDs 56A, 58A. Implementation of the tapes, or other sealing type members, helps alleviate light incoupling into the lightguides 60A, 62A, which may cause straylight, where light is coupled into a wrong lightguide 60A, 62A. However, these solutions may include more involved and/or specialized assembly steps/procedures.

As illustrated in FIG. 3, the LEDs 56A, 58A may be assembled on different heights in order to be on a same level with the corresponding lightguide 60A, 62A. For example, the second LED 58A may be attached to a raised portion of the FPC 54A to accommodate for the added height of the stacked lightguides 60A, 62A. Providing for different attachment heights for the LEDs 56A, 58A may also include more involved and/or specialized assembly steps/procedures and tolerance considerations.

Figure 4:
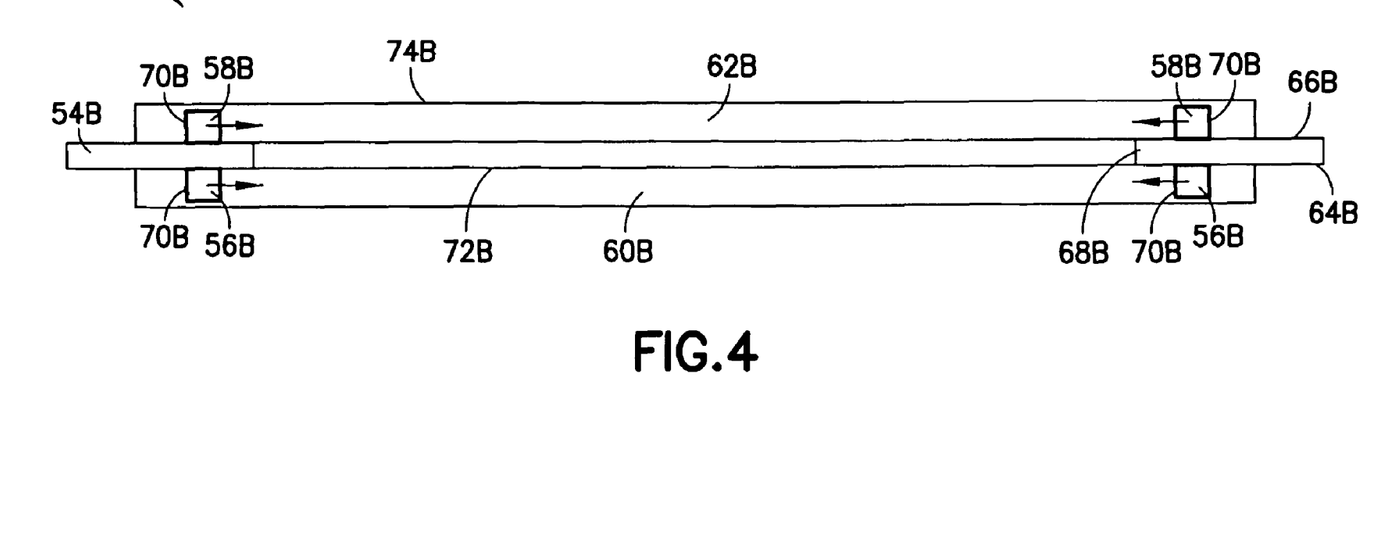
FIG. 4 is a side view of an exemplary lightguide module used in the keypad assembly shown in FIG. 2.
Figure 5:
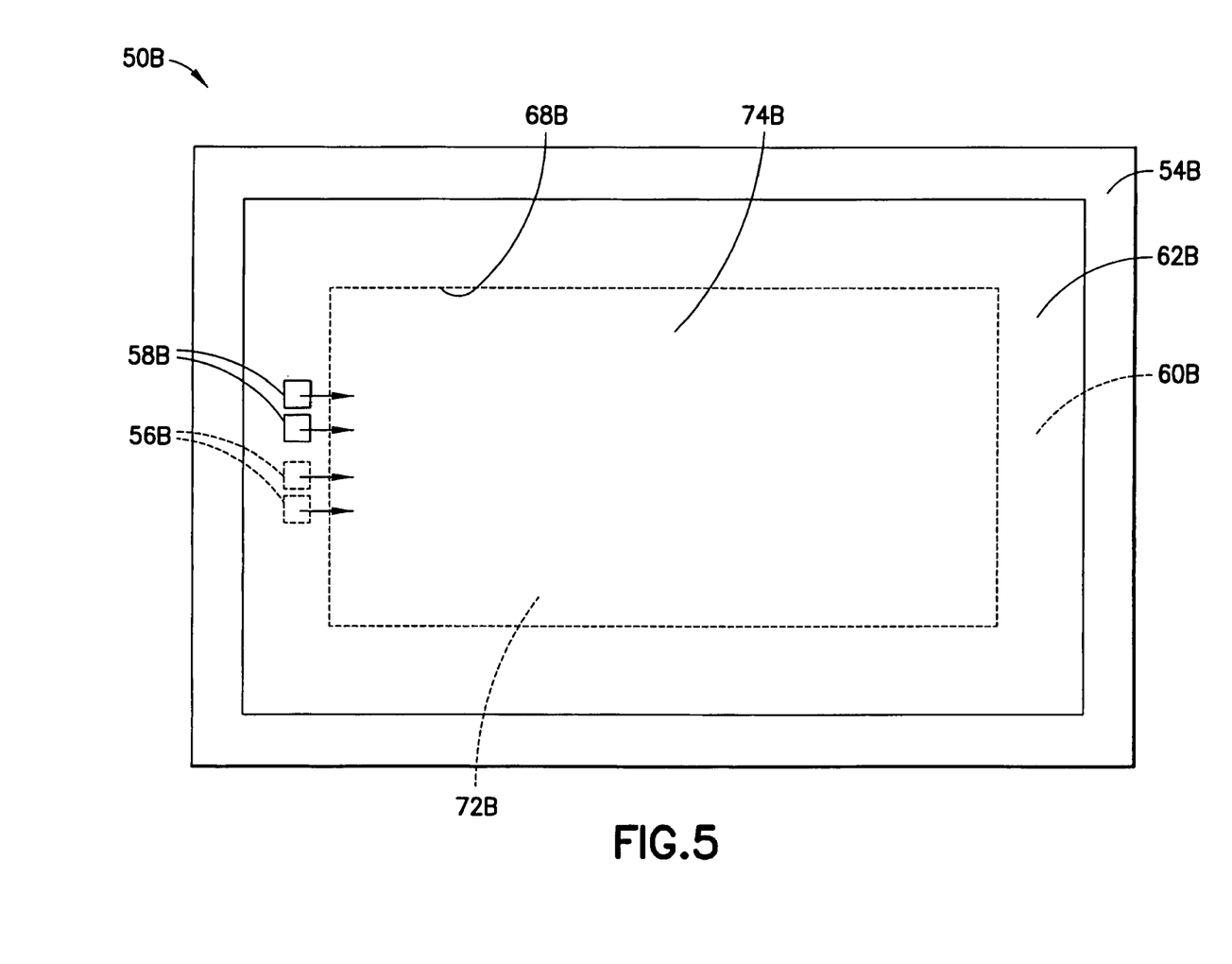
FIG. 5 is a top view of the another exemplary lightguide module shown in FIG. 4.

A lightguide module 50B according to one embodiment of the invention is illustrated in FIGS. 4 and 5. The lightguide module 50B may be provided in the keypad assembly 24, for example. However, the lightguide module 50B may be provided in any suitable type of keypad assembly. The lightguide module 50B comprises a flexible printed wiring board (PWB) 54B, first light emitting diodes (LEDs) 56B, a second LEDs 58B, a first lightguide 60B, and a second lightguide 62B.

The configuration of the lightguide module 50B provides for attachment of the LEDs (or light sources) 56B, 58B and the light guides 60B, 62B on opposite sides of the flexible PWB 54B and using the flexible PWB 54B to prevent light from going to wrong light guide.

The flexible PWB, or flexible printed circuit (FPC), 54B comprises a first side 64B and an opposite second side 66B. The flexible PWB 54B also comprises an opening 68B extending between the first side 64B and the second side 66B.

The first LEDs 56B are attached to the first side 64B of the flexible PWB 54B. The second LEDs 58B are attached to the second side 66B of the flexible PWB 54B. The first and the second LEDs 56B, 58B may be side type LEDs for example. However, any suitable type of LEDs may be provided. Additionally, the first and the second LEDs 56B, 58B may be attached or fastened to the flexible PWB 54B in any suitable fashion.

The first lightguide, or lower light guide, 60B may be attached to the first side 64B of the flexible PWB 54B. The first lightguide 60B may be attached or fastened to the flexible PWB 54B in any suitable fashion. The second lightguide, or upper light guide, 62B may be attached to the second side 66B of the flexible PWB 54B. The second lightguide 62B may be attached or fastened to the flexible PWB 54B in any suitable fashion. The lightguides 60B, 62B may also comprise openings 70B suitably sized and shaped to receive the LEDs 56B, 58B. The openings 70B may further support the LEDs 56B, 58B by connecting or attaching the LEDs 56B, 58B to the lightguides 60B, 62B. However, in alternate embodiments, the LEDs may be directly attached or fastened to the lightguides 60B, 62B in any suitable fashion. In another alternate embodiment, the first and the second LEDs 56B, 58B may be connected to the lightguides 60B, 62B with supporting members therebetween. Further, the openings 70B may be sized larger than the LEDs 56B, 58B such that a clearance is provided therebetween. However, it should be noted that the openings 70B are not required. For example, in one alternative embodiment, the lightguides may be between the LEDs. Additionally, other alternative embodiments are envisioned wherein the LEDs may be connected or attached only to the lightguides. In yet another alternative embodiment, the lightguides may be only connected or attached to the LEDs. However, any suitable mounting configuration may be provided.

The LEDs 56B, 58B may be disposed proximate the opening 68B of the flexible PWB 54B, wherein the first and the second LEDs 56B, 58B are arranged proximate opposite sides of the opening 68B (best shown in FIG. 4). However, it should be noted that in alternate embodiments, more or less LEDs may be provided. For example, in one embodiment, the first and/or the second LEDs may be provided proximate a single side of the opening. In another embodiment, the first and/or the second LEDs may be provided proximate three or more sides of the opening.

Each of the lightguides 60B, 62B is configured to transfer light from the light source 56B, 58B to the user input region. Light is emitted from the side LEDs 56B, 58B and incoupled into the lightguides 60B, 62B. Each of the lightguides 60B, 62B comprises a surface 72B, 74B having, on certain areas of the lightguide surfaces 72B, 74B, prismatic shapes, which turn the light out perpendicularly from the lightguide 60B, 62B. This light from the surfaces 72B, 74B of the lightguides 60B, 62B provides light to the user input region 20. The surfaces 72B, 74B may be light permeable surfaces, for example.

The opening 68B of the flexible PWB 54B allows light from the lower light guide 60B to be guided through the upper light guide 62B for illumination of the user input region 20. The opening 68B comprises a general square shape and may be located along a general center portion of the flexible PWB 54B. This provides for the opening 68B to be located proximate the surface 72B of the lower lightguide 60B. However, it should be noted that any suitable shape or location for the opening may be provided.

The lightguide module 50B provides the lightguides 60B, 62B on top and under the flex-PCB 54B (instead of both on top of the flex-PCB). This allows light from the different LEDs 56B, 58B to be separated and helps prevent straylight (between the two light sources 56B, 58B).

The lightguides 60B, 62B may provide illumination for various graphics modes for the user input region, or keypad, 20. For example, the user input region 20 may include an overlayed changeable graphics configuration. The overlayed changeable graphics configuration provides a graphics changing keypad (GCK) which displays the different graphics modes/configurations.

Figure 6:
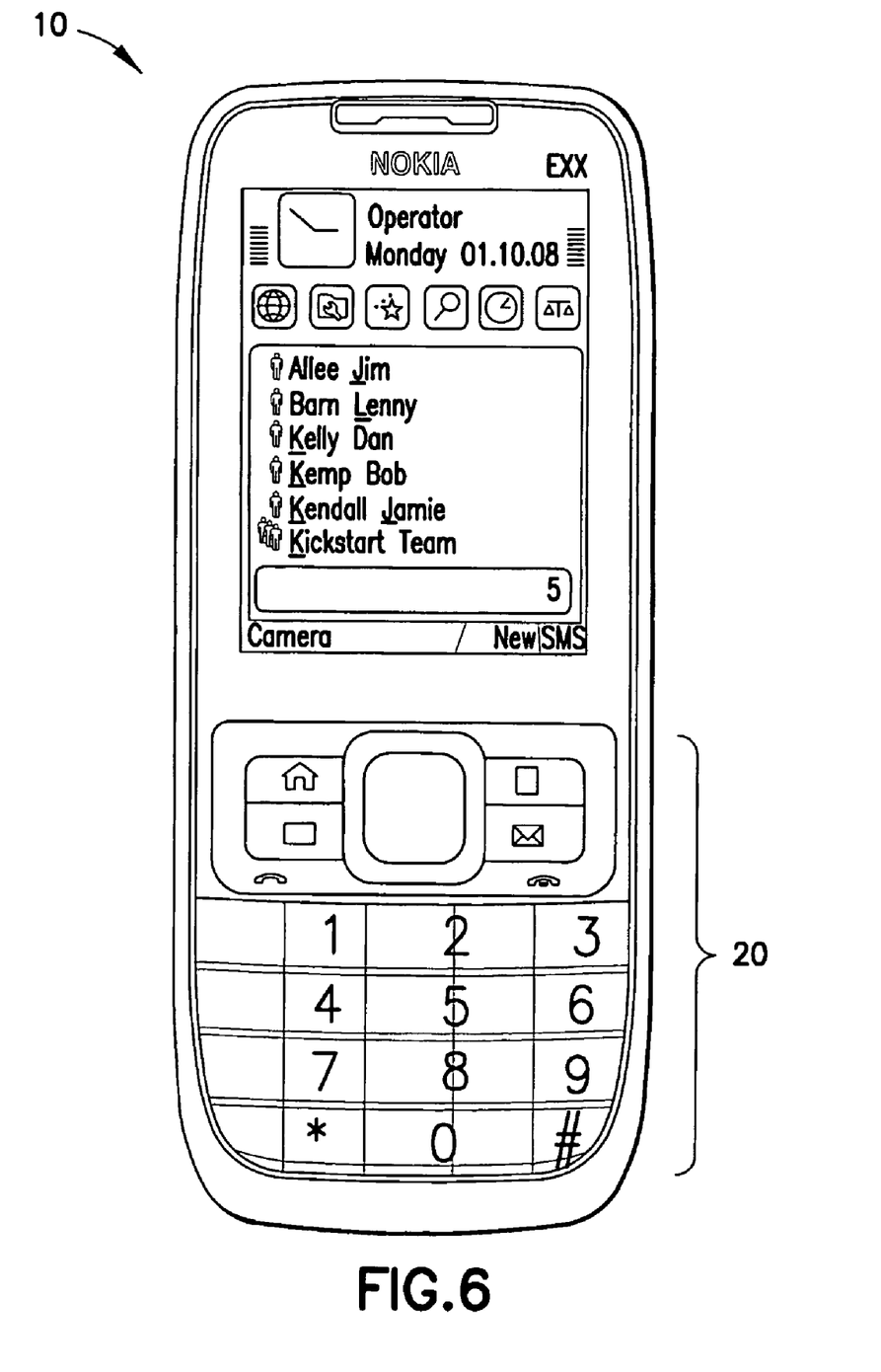
FIG. 6 is a front view of the electronic device shown in FIG. 1 with the user input region in a number mode.
Figure 7:
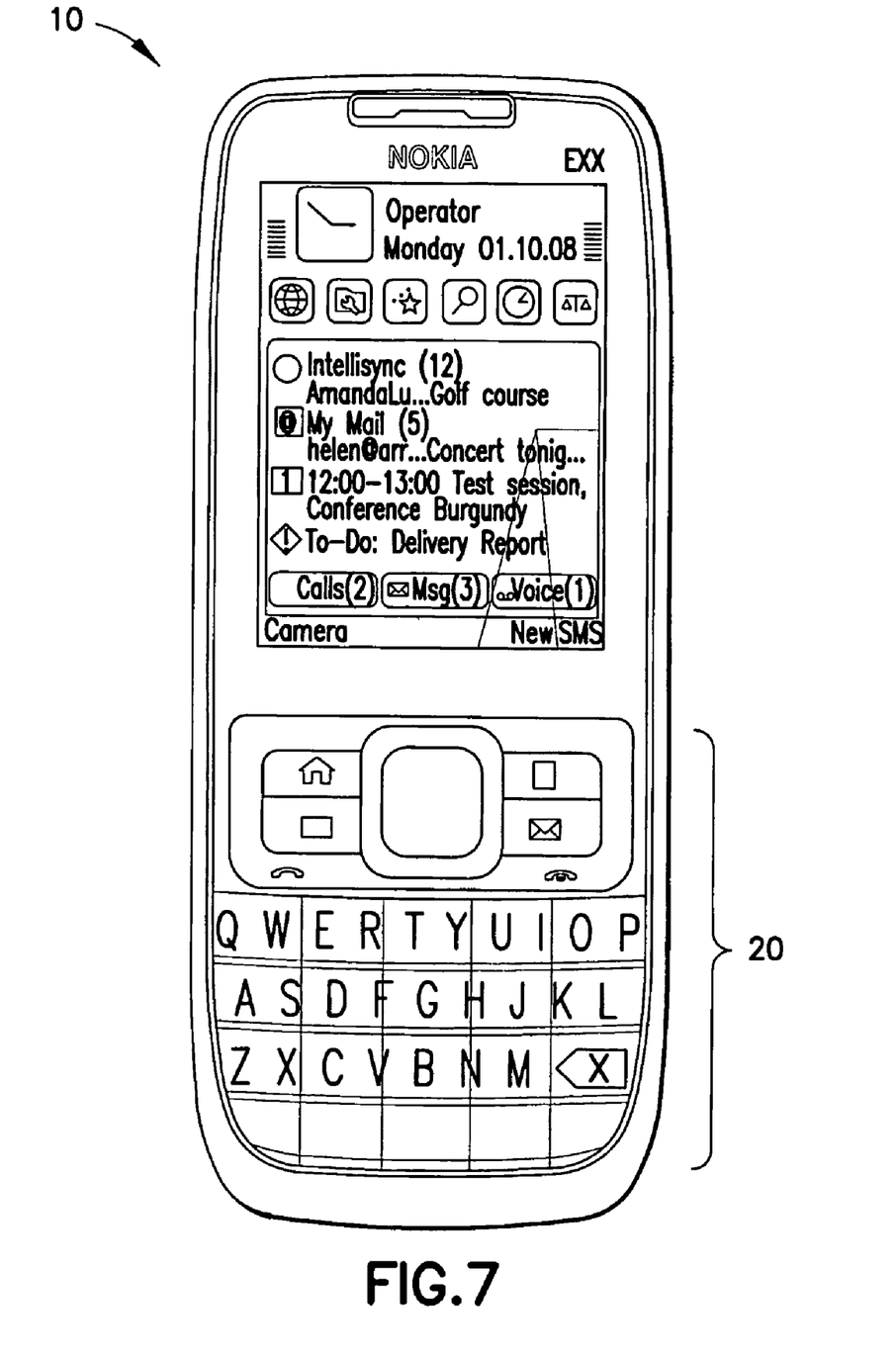
FIG. 7 is a front view of the electronic device shown in FIG. 1 with the user input region in an alphabet mode.

The graphics modes may include a hidden mode (shown in FIG. 1), a number mode (shown in FIG. 6), and an alphabet mode (shown in FIG. 7). However, any other suitable input modes (or combination of modes) may be provided. The interconnection of the LEDs 56B, 58B to the stacked lightguides 60B, 62B may provide for illumination of the keypad 20 in the above mentioned modes. For example, the first lightguide 60B may provide light to the user input region 20 to display the number mode (which may include the numbers 0-9, for example). The second lightguide 62B may provide light to the user input region 20 to display the alphabet mode (which may standard "QWERTY" keyboard layout, for example). Activation or deactivation of both the light sources 56B, 58B and lightguides 60B, 62B may provide the hidden mode (showing neither numbers nor characters on the keypad 20, for example). However, these are merely examples and any combination may be provided. For example, first lightguide 60B may correspond to the alphabet mode and second lightguide 62B may correspond to the number mode. Additionally, in one embodiment, both lightguides may provide a single graphics mode. In another embodiment, a single lightguide may provide more than one graphics mode. Additionally, it should be understood that any number of graphics modes (or display modes), lightguides, light sources, or combinations thereof may be provided.

Figure 8:
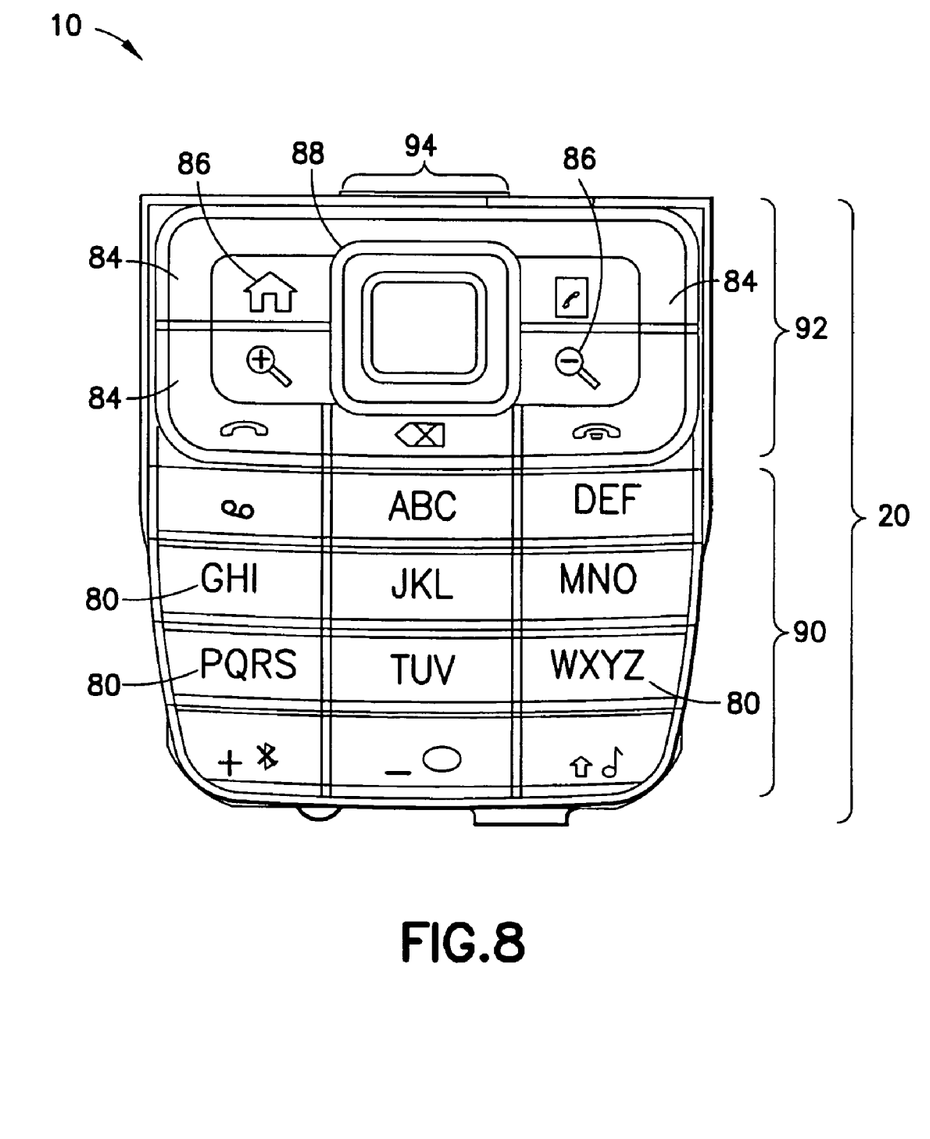
FIG. 8 is a partial front view of the electronic device shown in FIG. 1 with the user input region in a number mode.
Figure 9:
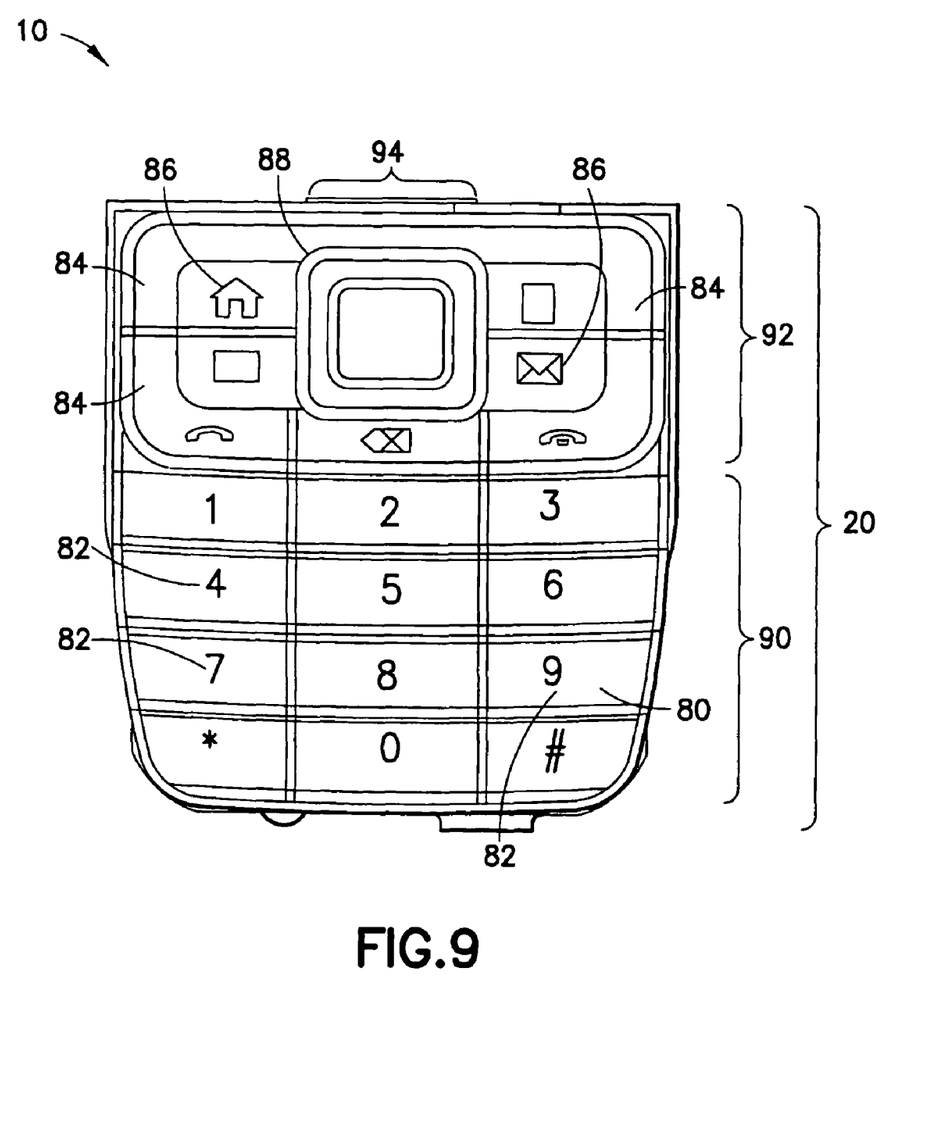
FIG. 9 is a partial front view of the electronic device shown in FIG. 1 with the user input region in an alphabet mode.
Figure 10:
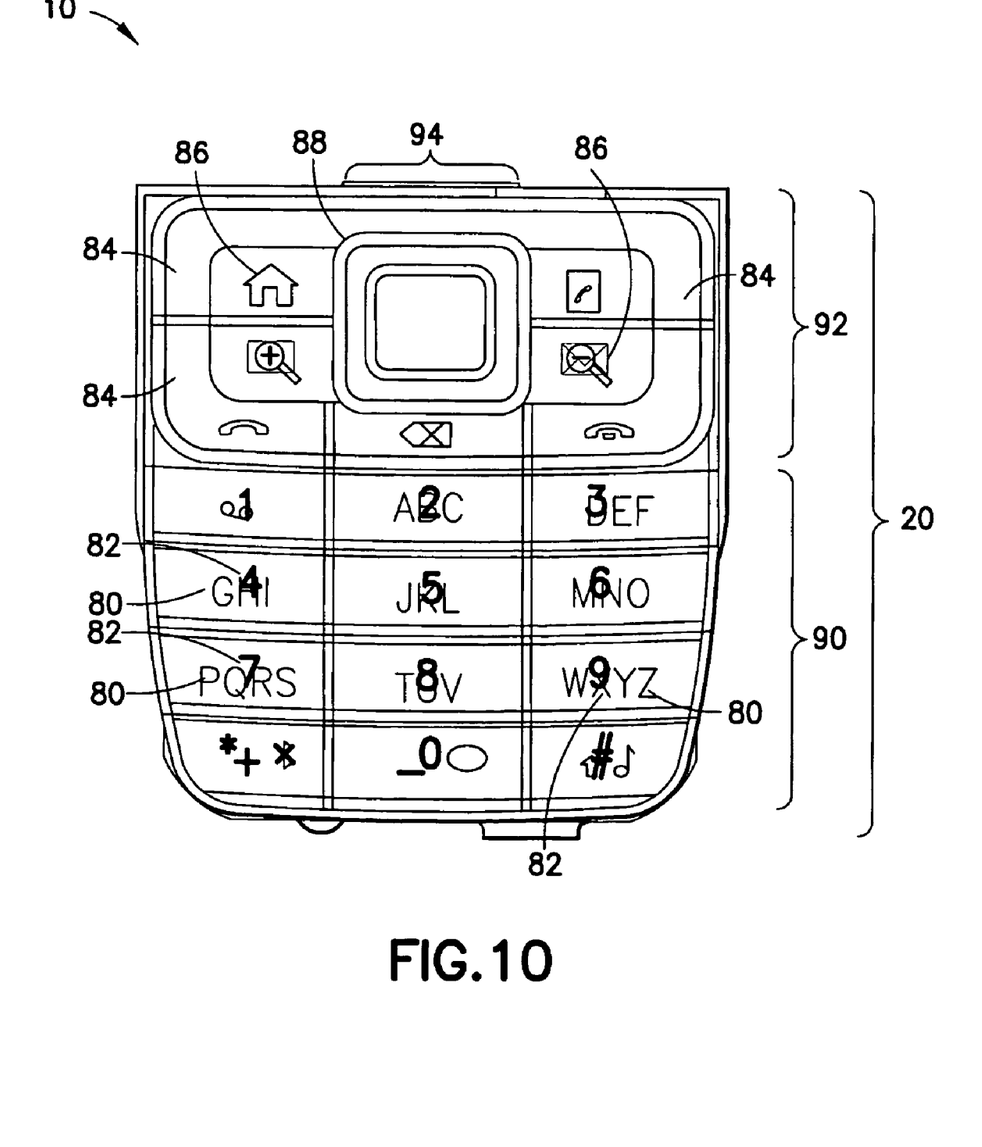
FIG. 10 a partial front view of the electronic device shown in FIG. 1 with the user input region displaying numbers and characters.

Referring now also to FIGS. 8-10, further graphics modes are illustrated. In one embodiment, the lightguides 60B, 62B may provide five separate independent lit modes to the user input region 20. The lit modes may include illumination for the graphical display of characters 80, numbers 82, zoom keys 84, function keys 86, and navigation rocker (lighting) 88, for example. Additionally, in one embodiment, the lightguides 60B, 62B may provide three separate independent lit areas. The lit areas may include the ITU keypad area (characters and/or numbers) 90, navigation key areas (such as navigation keys, zoom or function keys) 92, and navigation rocker area 94. Illumination for the different modes and areas may be provided by implementing the flexible PWB 54B with the opening 68B in the middle (or center portion) to allow light from the lower light guide 60B to be guided through upper light guide 62B and to the keypad 20 showing different markings than light from upper light guide 62B. It should be noted that the modes and areas described above are provided as non-limiting examples and alternative embodiments may provide more or less modes and/or areas.

Figure 11:
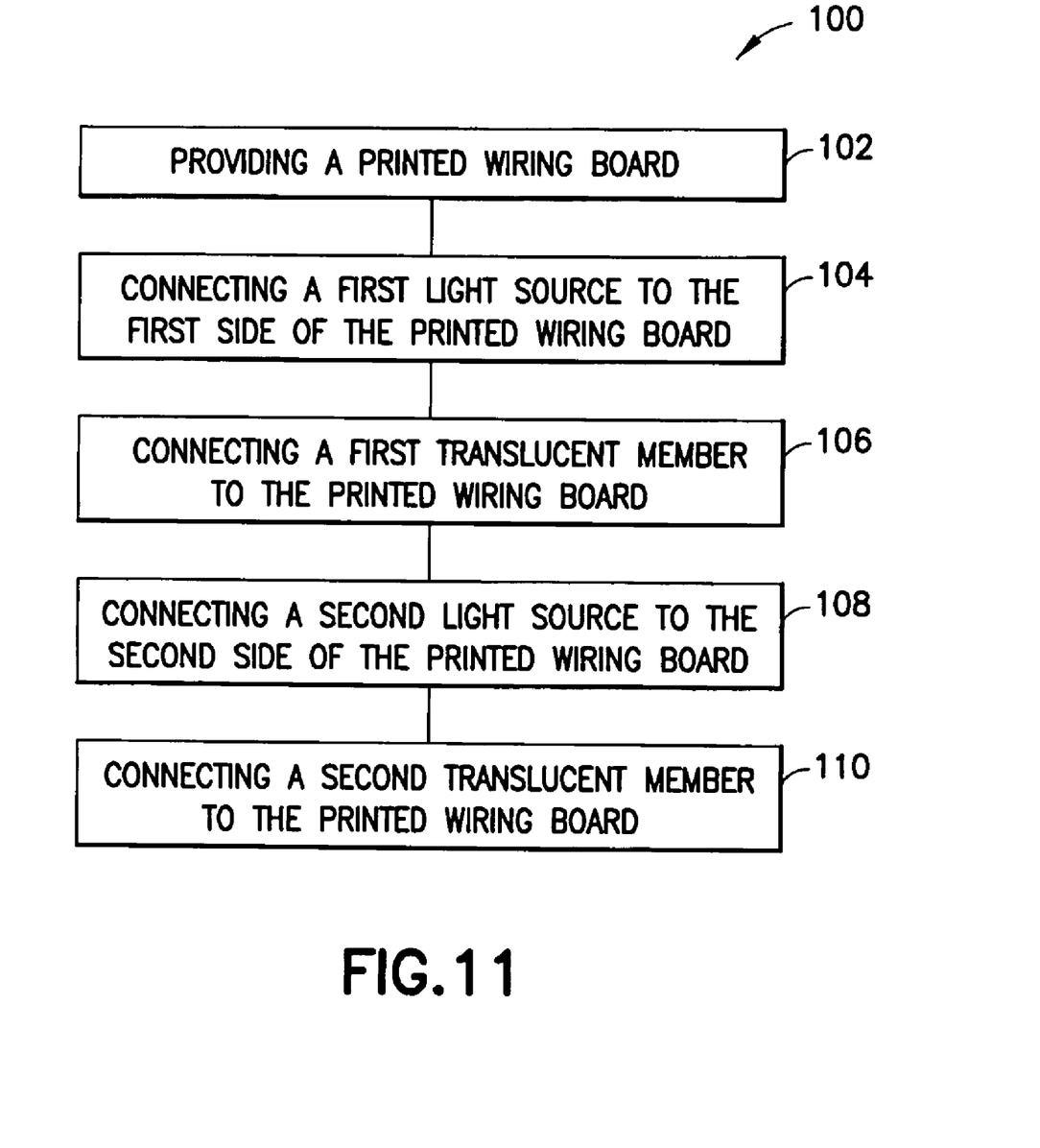
FIG. 11 is a block diagram of an exemplary method of manufacturing the lightguide module shown in FIG. 4.

FIG. 11 illustrates a method 100 of manufacturing. A printed wiring board 54B is provided (step 102). The printed wiring board 54B includes a first side 64B and a second side 66B. A first light source 56B is connected to the first side 64B of the printed wiring board 54B (step 104). A first translucent member 60B is connected to the printed wiring board 54B (step 106). The first translucent member 60B is configured to transfer light from the first light source 56B to a surface 72B of the first translucent member 60B. A second light source 58B is connected to the second side 66B of the printed wiring board 54B (step 108). A second translucent member 62B is connected to the printed wiring board 54B (step 110). The second translucent member 62B is configured to transfer light from the second light source 58B to a surface 74B of the second translucent member 62B. It should be noted that any of the above steps may be performed alone or in combination with one or more of the steps.

Figure 12:
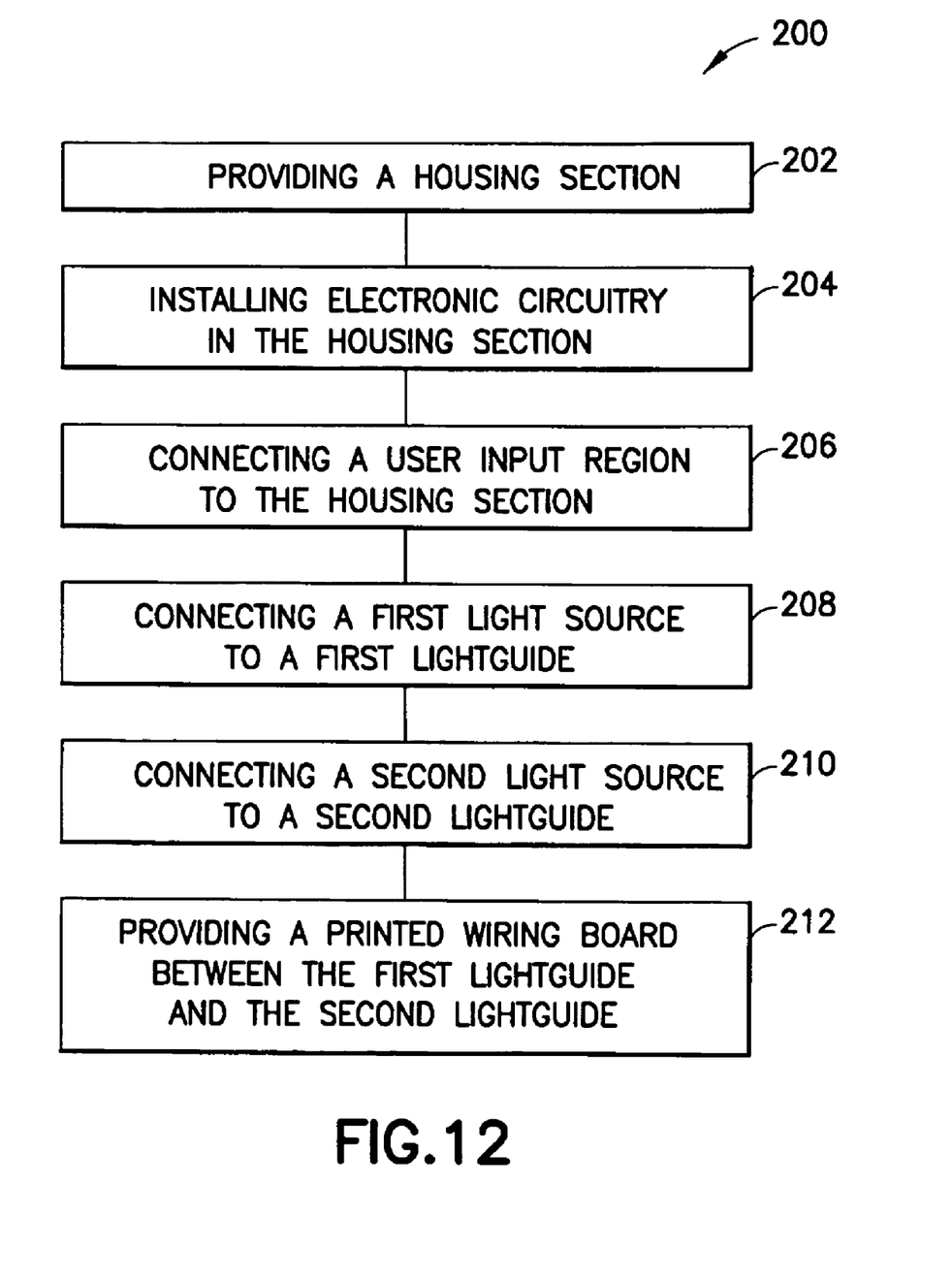
FIG. 12 is a block diagram of an exemplary method of manufacturing the device shown in FIG. 1.

FIG. 12 illustrates another method 200 of manufacturing. A housing section 12 is provided (step 202). Electronic circuitry 18 is installed in the housing section 12 (step 204). A user input region 20 is connected to the housing section 12 (step 206). A first light source 56B is connected to a first lightguide 60B (step 208). The first lightguide 60B is configured to deliver light from the first light source 56B to the user input region 20. A second light source 58B is connected to a second lightguide 62B (step 210). The second lightguide 62B is configured to deliver light from the second light source 58B to the user input region 20. A printed wiring board 54B is provided between the first lightguide 60B and the second lightguide 62B (step 212). The printed wiring board 54B is configured to separate light emitting from the first light source 56B and the second light source 58B. It should be noted that any of the above steps may be performed alone or in combination with one or more of the steps.

Various embodiments of the invention provide significant advantages over conventional configurations by providing the two light guides with separate light sources to the mobile device. Additional advantages may be provides by the implantation of the flexible PWB as a base, where both of the light guides and the light sources are attached. Further, each light guide has their own light source and the flexible PWB prevents mixing of light as it is transferred from light source to the light guide.

Additionally, attachment of the light guides and the sources to the flexible PWB does not require complicated manufacturing methods. The flexible PWB also acts as a fastening structure for the device and is configured to allow the passage of light (through the opening) from the first lightguide to the second lightguide. The flexible PWB also prevents mixing of the light so that light from the light source(s) goes only to the relevant (or corresponding) light guide.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
   a printed wiring board comprising a first side and a second side;
   a first light source connected to the first side of the printed wiring board;
   a first translucent member connected to the printed wiring board, wherein the first translucent member is configured to transfer light from the first light source to a surface of the first translucent member;
   a second light source connected to the second side of the printed wiring board; and
   a second translucent member connected to the printed wiring board, wherein the second translucent member is configured to transfer light from the second light source to a surface of the second translucent member
   wherein the apparatus is configured to transfer light from the first translucent member directly to the second translucent member through an opening in the printed wiring board.

2. The apparatus of claim 1 wherein the first translucent member is attached to the first side of the printed wiring board.

3. The apparatus of claim 1 wherein the second translucent member is attached to the second side of the printed wiring board.

4. The apparatus of claim 1 wherein the first light source is attached to the first translucent member.

5. The apparatus of claim 1 wherein the second light source is attached to the second translucent member.

6. The apparatus of claim 1 wherein the first translucent member is a first lightguide, and wherein the second, translucent member is a second lightguide.

7. The apparatus of claim 1 wherein the printed wiring board is configured to separate light emitting from the first light source and the second light source.

8. The apparatus of claim 1 wherein the first light source is attached to the first side of the printed wiring board, and wherein the second light source is attached to the second side of the printed wiring board.

9. The apparatus of claim 1 wherein the first side of the printed wiring board is opposite the second side of the printed wiring board.

10. The apparatus of claim 1 wherein the surfaces of the translucent members are configured to provide light to a user input region.

11. An apparatus comprising:
    a housing section;
    electronic circuitry mounted in the housing section;
    a user input region connected to the housing section; and
    an apparatus as in claim 1 mounted in the housing section proximate the user input region.

12. An apparatus comprising:
    a housing section;
    electronic circuitry mounted in the housing section;
    a user input region connected to the housing section;
    a first light source connected to a first lightguide, wherein the first lightguide is configured to deliver light from the first light source to the user input region;
    a second light source connected to a second lightguide, wherein the second lightguide is configured to deliver light from the second light source to the same user input region; and
    a printed wiring board between the first lightguide and the second lightguide, wherein the printed wiring board is configured to separate light emitting from the first light source and the second light source;
    wherein the apparatus is configured to transfer light from the first lightguide directly to the second lightguide through an opening in the printed wiring board.

13. The apparatus of claim 12 wherein the opening is configured to allow passage of light from the second lightguide to the user input region.

14. The apparatus of claim 12 wherein the first lightguide is configured to guide light from the second lightguide to the user input region.

15. The apparatus of claim 12 wherein the first light source is a first light emitting diode, and wherein the second light source is a second light emitting diode.

16. The apparatus of claim 12 wherein the printed wiring board is a flexible printed wiring board.

17. The apparatus of claim 12 wherein the first lightguide is configured to provide a first user input region configuration, wherein the second lightguide is configured to provide a second user input region configuration, wherein the first and the second user input region configurations comprise a numeric keypad layout and a QWERTY keypad layout.

18. The apparatus of claim 12 wherein the printed wiring board is between the first light source and the second light source.

19. The apparatus of claim 12 wherein the first lightguide and the second lightguide each comprise a light permeable surface.

20. The apparatus of claim 19 wherein the light permeable surface of the second lightguide is adjacent the printed wiring board.

21. A method comprising:
providing a printed wiring board comprising a first side, a second side, and an opening;
connecting a first light source to the first side of the printed wiring board;
connecting a first translucent member to the printed wiring board, wherein the first translucent member is configured to transfer light from the first light source to a surface of the first translucent member;
connecting a second light source to the second side of the printed wiring board, wherein the second lightguide is proximate a user input region of a device; and
connecting a second translucent member to the printed wiring board, wherein the second translucent member is configured to transfer light from the second light source to a surface of the second translucent member
wherein the opening of the printed wiring board extends between the first translucent member and the second translucent member without another member therebetween, and wherein the device is configured to transfer light from the first translucent member directly to the second translucent member through the opening of the printed wiring board.

22. The method of claim 21 wherein the connecting of the first translucent member to the printed wiring board further comprises attaching a first lightguide to the printed wiring board.

23. The method of claim 22 wherein the connecting of the second translucent member to the printed wiring board further comprises attaching a second lightguide to the printed wiring board.

24. The method of claim 21 wherein the connecting of the first light source to the first side of the printed wiring board further comprises attaching a first light emitting diode to the first side of the printed wiring board.

25. The method of claim 24 wherein the connecting of the second light source to the second side of the printed wiring board further comprises attaching a second light emitting diode to the second side of the printed wiring board.

26. A method comprising:
providing a housing section for a device;
installing electronic circuitry in the housing section;
connecting a user input region to the housing section;
connecting a first light source to a first lightguide, wherein the first lightguide is configured to deliver light in a first direction from the first light source to the user input region;
connecting a second light source to a second lightguide, wherein the second lightguide is configured to deliver light substantially in the first direction from the second light source to the user input region; and
providing a printed wiring board between the first lightguide and the second lightguide, wherein the printed wiring board is configured to separate light emitting from the first light source and the second light source;
wherein the device is configured to transfer light from the first lightguide directly to the second lightguide through an opening in the printed wiring board.

27. The method of claim 26 wherein the connecting of the first light source to the first light guide and the connecting of the second light source to the second light guide further comprises connecting a first light emitting diode to the first light guide and connecting a second light emitting diode to the second light guide.

28. The method of claim 26 further comprising attaching the first light source to a first side of the printed wiring board and attaching the second light source to a second side of the printed wiring board.

29. The method of claim 26 further comprising attaching the first light guide to a first side of the printed wiring board.

30. The method of claim 29 further comprising attaching the second light guide to a second side of the printed wiring board.

* * * * *